June 11, 1968  H. M. SUEOKA  3,387,853
TRAILER
Filed Aug. 26, 1965
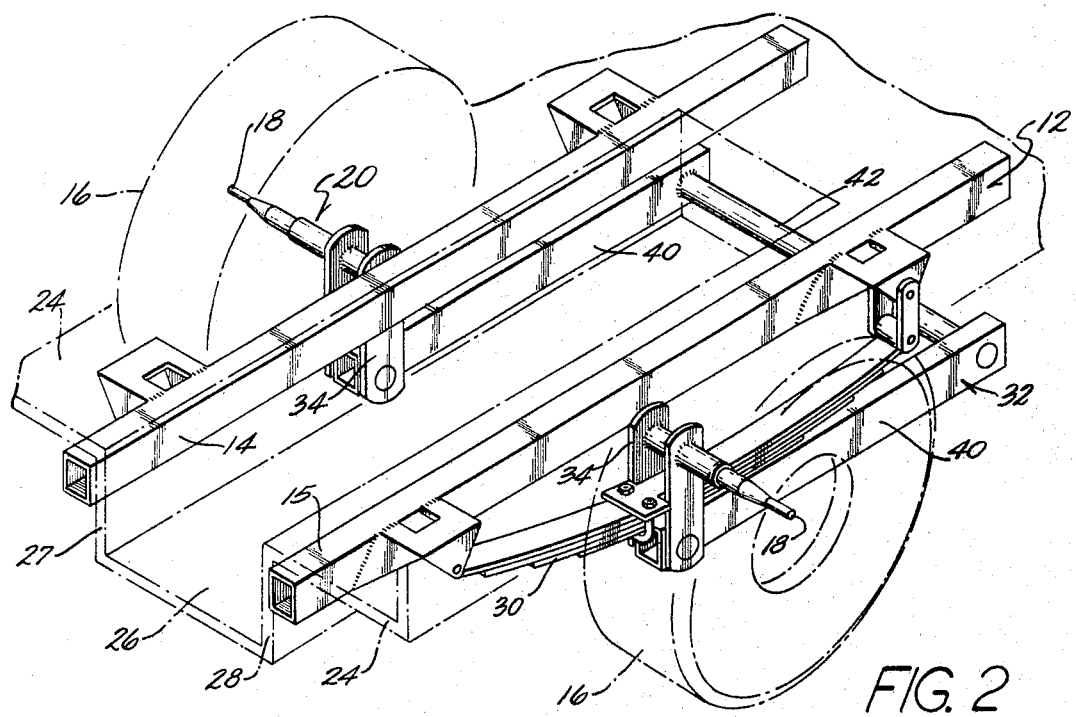
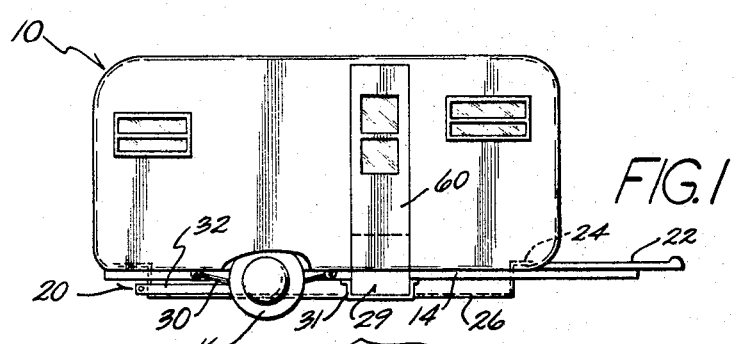
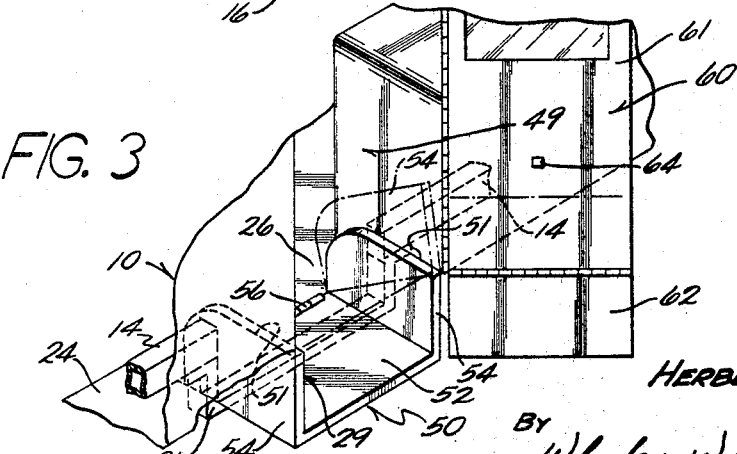
INVENTOR
HERBERT M. SUEOKA
BY
Wheeler, Wheeler & Wheeler
ATTORNEYS

United States Patent Office 3,387,853
Patented June 11, 1968

3,387,853
TRAILER
Herbert M. Sueoka, 1130 S. 112th St.,
Greenfield, Wis. 53214
Filed Aug. 26, 1965, Ser. No. 482,706
4 Claims. (Cl. 296—23)

ABSTRACT OF THE DISCLOSURE

Disclosed herein is the combination in a trailer of a frame including a pair of coaxial wheel spindles, a vehicle body mounted on the frame and including a floor havinb an upper level and a lower level, each of said levels extending forward and rearwardly of the axis of the spindles, together with means connecting the spindles to afford extension of the lower level between the spindles and a step movably connected to the frame and selectively positionable to afford entrance to the trailer at the level of said lower level.

This invention relates to trailers and, more particularly, to travel or house trailers.

The invention provides for a trailer having a step-down floor area. The invention further provides for a trailer having an entrance step which affords entrance to the trailer at the step-down floor level. In accordance with the invention, the trailer is provided with a floor having a recessed portion and an axle including a pair of wheel spindles. The axle includes an off-set portion which is arranged to afford extension of the recessed floor portion between the wheel spindles to thereby afford increased recess floor portion area. An entrance step is pivotally connected to the trailer and arranged for swingable movement between positions of use and non-use. In the position of use, the step affords entrance to the trailer at the recessed floor portion level. When in the position of non-use, the step is swung upwardly and out of the way to prevent damage thereto during travel and to afford clearance for curbs and other objects during travel.

Other objects, features and advantages which will become apparent from the following description and accompanying drawings in which:

FIGURE 1 is a side-elevational view of a trailer embodying various of the features of the invention;

FIGURE 2 is a perspective view of a portion of the trailer shown in FIGURE 1; and FIGURE 3 is a perspective view of another portion of the trailer as shown in FIGURE 1.

Referring now to the drawings and more particularly to FIGURES 1 and 2, the trailer 10 is carried on a frame 12 having parallel side bars 14 and 15. Wheels 16 are rotatably carried on wheel spindles 18 which form part of an axle generally identified by the numeral 20 (FIGURE 2). The trailer 10 can be selectively attached to another vehicle for towing by means of the hitch bar 22 (FIGURE 1).

The trailer 10 includes a floor 24 providing a first floor level and a recessed or step-down portion 26 defining a second floor level. The recessed portion 26 extends between the parallel side bars 14 and 15 of the frame 12. The recessed floor portion 26 is joined to the first floor level by the perpendicular floor parts 27 and 28. The perpendicular floor part 27 and the corresponding frame side bar 14 are cut-out at 29 (FIGURE 3) to accommodate entrance to the trailer 10 at the second floor level, as will hereinafter be described.

The disjoined ends of the side bar 14 are connected by a suitable U-shaped bracket 31 which extends downwardly to at least the plane of the second floor level (FIGURES 1 and 3).

A pair of suspension springs 30 are suitably connected to the frame 12 and operatively carry the axle 20 transverse thereof. The axle 20 includes means for inter-connecting the spindles 18 to afford extension of the step-down portion 26 between the spindles 18. As can be noted from FIGURE 2, the wheel spindles 18 are disposed on a common center line which is transverse to the frame 12 and generally located between the first and second floor levels 24 and 26 respectively.

In the preferred embodiment, the axle includes an offset or U-shaped portion 32 fixedly connected at the free ends thereof to brackets 34 which carry the spindles 18 and which are clamped to the springs 30. The offset portion 32 comprises a pair of side bars 40 and a transverse bar 42 which are disposed to afford extension of the recessed floor portion 26 between the spindles 18 to thereby afford increased recessed portion area. With the conventional axles, the recessed portion terminates at the axle.

To afford convenient access to the trailer 10 at the level of the recessed floor portion 26, the trailer 10 is provided with an entranceway or opening 49 communicating with the cut-out 29 (FIGURE 3) and an entrance step 50 which is hingedly carried on trailer 10 for swingable movement between positions of use and non-use. The entrance opening 49 includes a cut-out portion 51 in the floor 24 to allow swinging movement of the step 50 in the entranceway 49. The step 50 includes a tread or flat portion 52 and perpendicular side portions 54. The step is hinged at 56 to the recessed floor portion 26 (FIGURE 3). When in the position of use, the tread portion 52 is disposed in the plane of the recessed floor portion 26 to provide convenient entrance to the trailer at the level of the recessed floor portion 26 and to effectively extend the entrance opening 49 to the second floor level. When the step 50 is in a position of non-use, as when traveling, the step 50 is swung upwardly and out of the way to prevent damage to the step 50 as by hitting obstructions such as curbs or other things. In the non-use position, the tread portion 52 is angularly related to the recessed portion floor level 26. Any suitable means (not shown) can be provided to hold the step in the positions of use and non-use.

To provide a full closure for the entranceway 49 when the step 50 is in the position of use, the trailer 10 is provided with a door 60 which includes a main part 61 and a hinged portion 62 selectively swingable downwardly from the main part 61 to thereby extend the door 60 to fully cover the entranceway 49 as extended by the step 50. When the step 50 is swung upwardly, to the non-use position (as shown in FIGURE 1 and by phantom lines in FIGURE 3), the hinged door portion 62 can be folded to a position in over-lying relation to a lower portion of main part 61 (as shown by broken lines in FIGURES 1 and 3) and connected or held in that position by any suitable locking device or latch 64 (shown schematically in FIGURE 3).

Various of the features of the invention are set forth in the following claims.

I claim:

1. The combination in a trailer of a frame including a pair of coaxial wheel spindles, a vehicle body mounted on said frame and including a floor having an upper level and a lower level, each of said levels extending forwardly and rearwardly of the axis of said spindles, means connecting said spindles to afford extension of said lower level between said spindles and a step movably connected to said frame and selectively positionable to afford entrance to said trailer at the level of said lower level.

2. A trailer in accordance with claim 1 including a perpendicular wall between said first and second levels having an opening therein, and a step hingedly connected to said floor and being swingable in said opening between positions of use and non-use, said step including a flat portion selectively positionable in the plane of said second level when in said use position to provide entrance to said recessed portion at said second level and being selectively positionable at an angle to said second level when in said non-use position.

3. A trailer comprising a frame, a vehicle body carried on said frame and including a floor comprising a portion providing a first level and a recessed portion providing a second level, a perpendicular wall between said first and second levels having an opening therein, a step hingedly connected to said floor and being swingable in said opening between positions of use and non-use, said step including a flat portion selectively positionable in the plane of said second level when in said use position to provide entrance to said recessed portion at said second level and being selectively positionable at an angle to said level when in said non-use position, a door carried on said vehicle body, said door having a hinged portion swingable to a position covering said step when in said use position, said hinged portion being foldable to a position in overlying relation to said door an axle carried on said frame, said axle having opposite wheel spindles disposed transverse to said frame and generally located between said first and second levels and intermediate the ends of said recessed portion, said axle including an offset portion located between said first and second floor levels and extending beyond one of the ends of said recessed portion and between said wheel spindles.

4. The combination of a trailer having upper and lower floor levels having horizontally spaced outer edges, and a step including a flat portion and a hinge adapted to connect said flat portion to said lower floor portion of the trailer inwardly of the outer edge of said upper floor portion coaxial with an extension of the junction of said perpendicular wall and said lower floor level to afford selective swingable positioning of said step between a first position of use in which said flat portion is located in the plane of the second floor level to afford entrance to the trailer at the second floor level and a second position of non-use in which said flat portion is located at an angle to the plane of the first floor level to afford storage of said step.

References Cited
UNITED STATES PATENTS

| | | | |
|---|---|---|---|
| 1,134,952 | 4/1915 | Gamble | 280—2 |
| 2,409,418 | 10/1946 | Carmichael | 280—166 |
| 2,891,800 | 6/1959 | Starks | 280—2 |
| 3,288,521 | 11/1966 | Patnode | 296—23 |

BENJAMIN HERSH, *Primary Examiner.*

PHILIP GOODMAN, *Examiner.*